United States Patent [19]

Oushige et al.

[11] 3,725,808

[45] Apr. 3, 1973

[54] PROXIMITY SENSITIVE ON-OFF TRANSISTOR OSCILLATOR FOR CONTROLLING A RELAY CIRCUIT

[75] Inventors: Takayoshi Oushige; Yukio Kinoshita; Kikuo Iizuka; Yutaka Nishimiya, all of Hitachi-shi, Japan

[73] Assignee: Hitachi, Ltd., Tokyo, Japan

[22] Filed: Apr. 19, 1971

[21] Appl. No.: 135,221

[30] Foreign Application Priority Data

Apr. 20, 1970 Japan ....................................45/38940

[52] U.S. Cl. ....................331/65, 307/116, 317/146, 317/148.5 R, 331/117 R

[51] Int. Cl. ..........................H01h 47/32, H03b 5/12

[58] Field of Search.....331/65, 117 R; 307/116, 125, 307/308; 317/146, 148.5 R; 340/258 C; 328/5

[56] References Cited

UNITED STATES PATENTS

| | | | |
|---|---|---|---|
| 2,782,308 | 2/1957 | Rug | 331/65 |
| 3,422,415 | 1/1969 | Ichimori | 331/65 X |

*Primary Examiner*—Roy Lake
*Assistant Examiner*—Siegfried H. Grimm
*Attorney*—Craig, Antonelli & Hill

[57] ABSTRACT

A proximity sensitive on-off transistor oscillator becomes operative with the approach of a human body towards its detection plate, and includes back-coupled oscillation coils, an oscillating transistor, a negative feedback controlling capacitor connected between the collector and base of the transistor and a lead wire shielded by a shielding wire and connected between the oscillator and the detection plate.

2 Claims, 1 Drawing Figure

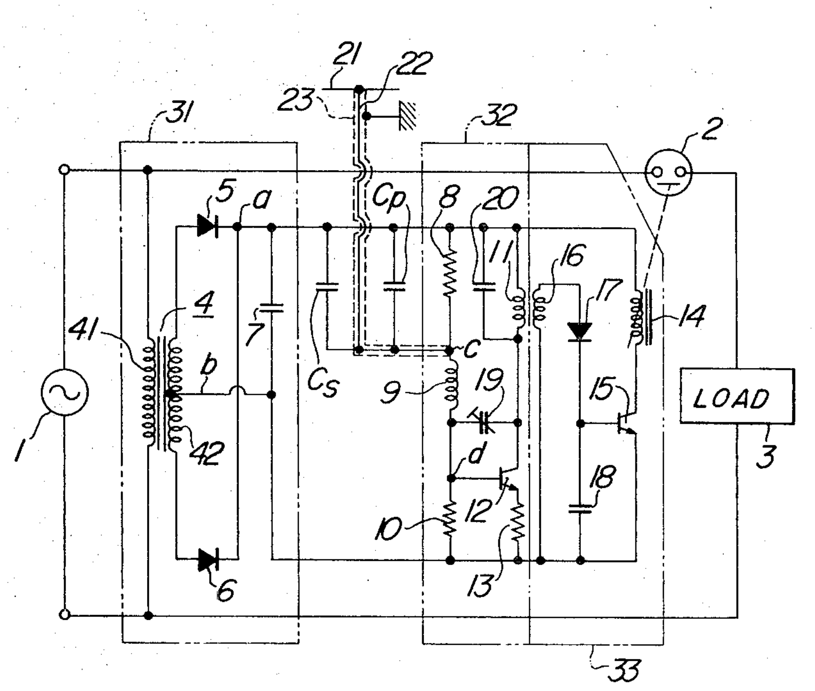
INVENTORS
TAKAYOSHI OUSHIGE, YUKIO KINOSHITA,
KIKUO IIZUKA AND YUTAKA NISHIMIYA
BY Craig, Antonelli & Hill
ATTORNEYS

PROXIMITY SENSITIVE ON-OFF TRANSISTOR OSCILLATOR FOR CONTROLLING A RELAY CIRCUIT

This invention relates to proximity switches, and more particularly to a proximity switch which displays an effect when used in the handle of an electronic range, the guard of an electric fan, the call-switch of an elevator, etc.

In an electronic range, when a user grips the handle to open the lid in order to heat and cook foods by a magnetron generating high frequency as the heating element, some measures should be taken so as to temporarily stop oscillation of the magnetron to prevent the high frequency produced by the magnetron from directly falling upon the human body, especially the eyes. In order to satisfy the above requirement, there has heretofore been a technique wherein a mechanical microswitch is provided so that the magnetron circuit is turned off when the lid is opened by a certain angle, or wherein the magnetron circuit is separated from the power supply by means of a solid-state circuit adapted to cause a leakage current to flow the moment a hand touches the handle.

An electric fan is used in summer in order to get cool. The electric fan is, in general, of the type in which blades are rotated within the guard. In case where the general type is used in homes, there is the fear of the occurrence of a serious accident if an infant, for example, thrusts his fingers into the guard by mistake thus injuring them due to the blade. For this reason, as in the electronic range referred to above, a measure has been considered with which when a part of the human body (in most cases, the fingers) is brought into contact with the guard covering the blades, the rotation of the blades is stopped in a moment by some means.

For the various requisites, a prior art measure has employed a proximity switch which is actuated merely by proximity of a part or the whole of the human body to a detection board thereof.

In the prior art, however, where the initial stray capacitance has been large on account of the arrangement of the detecting board, the output of an oscillating circuit of the switch has been small. Moreover, stray capacitance has been involved in the oscillating operation itself, resulting in an unstable operation of the switch. Consequently, merely when any object has come to a position sufficiently far away from the touching board, the switch has often been disadvantageously actuated. When this type of proximity switch has been used in, for example, domestic electrical products to effect control, reliability has been lacking and the degree of danger has become very high.

In view of the above disadvantages, this invention has been suggested.

A principal object of this invention is to provide a proximity switch which is always stable in operation and performs no misoperation.

A further object of this invention is to provide, in order to promote stabilization of the operation, a construction for shutting off the capacitance of a lead wire of a detecting plate.

The principal construction of this invention comprises a back-coupled oscillating circuit including as its main elements a transistor and a coil. The detecting plate serves to control the oscillation of the oscillating circuit.

The lead wire is shielded from the outside with respect to electrostatic capacitance.

The single FIGURE is a diagram of a concrete control circuit, showing an embodiment of this invention.

Referring to the FIGURE, a power supply 1, a relay contact 2, and a load 3 being, for example, a domestic electrical appliance or any other equipment to-be-controlled, constitute a closed series circuit. Across the power supply 1, the primary winding 41 of a step-down transformer 4 is connected. The secondary winding 42 of the step-down transformer 4 is connected at both ends with diodes 5 and 6 for performing full-wave rectification. The output sides (the cathode sides) of the diodes 5 and 6 are coupled onto a common terminal *a*, and between the terminal *a* and an intermediate terminal *b* of the secondary winding 42 a smoothing capacitor 7 is connected. Across both terminals of the smoothing capacitor 7, there are respectively connected a series circuit consisting of a resistor 8, an oscillating coil 9 and a resistor 10, a further series circuit consisting of an oscillating coil 11 back-coupled to the oscillation coil 9, an oscillating transistor 12 and a resistor 13, and a still further series circuit consisting of a relay coil 14 and a transistor 15. Shown at 16 is an output coil which is magnetically coupled to the oscillating coil 11, and with which a diode 17 and a capacitor 18 are connected in series. The base of the oscillating transistor 12 is connected to the connection point *d* between the oscillation coil 9 and the resistor 10. The capacitor 18 is connected between the base and emitter of the transistor 15. The relay coil 14 serves to energize the relay contact 2. Numeral 19 designates a capacitor for controlling negative feedback, which is connected between the collector and base of the oscillating transistor 12. It is a semi-fixed capacitor in the embodiment of this invention. Connected across both ends of the oscillating coil 11 is a capacitor 20 for resonance. A detecting board 21 is connected to the connection point *c* between the resistor 8 and the oscillation coil 9, and is mounted in such condition that is is electrically floating with respect to the appliance or equipment for mounting the proximity switch thereon. Blocks 31, 32 and 33 represented by broken lines, respectively show a DC power source circuit, an oscillating circuit and a relay energizing circuit. The resistance of the resistor 8 is usually set to be high, thereby suppressing the oscillation.

The operation of the control circuit will now be described.

When power is supplied from power supply 1 to circuit 31 , an AC voltage is induced in the secondary winding 42 of the step-down transformer 4. This AC voltage is full-wave rectified by the diodes 5, 6 to charge the capacitor 7. Thus the capacitor 7 acts as a DC power supply. The DC voltage of this capacitor 7 is applied to the series circuit of resistor 8, oscillation coil 9 and resistor 10, the resistance value of resistor 8 being very large, so that the connection point d is kept at a low potential and the oscillating transistor 12 is maintained in the OFF state. In this condition the terminal voltage of the oscillating coil 11 and capacitor 20 is too small to cause oscillation and produces no output in the output coil 16. The relay contact 2 is, therefore, kept closed. (Of course, this relay contact 2 may be designed to be held open in its normal state, in accordance with the load). The stray capacitance Cs, as well as the resistor 8, presents too large an impedance to cause oscillation.

Next, when the human body comes close to the detecting plate 21, this electrically results in the interconnection of the cpacitor *Cp* in parallel with the resistor 8. This capacitor of the detecting plate decreases its impedance as the human body comes closer thereto, and the potential of the connection point d correspondingly increases. The capacitor *Cp* presents a very small impedance as compared with the resistor 8 and stray capacitor *Cs*. Consequently, the oscillating transistor 12 is urged from the off state to the on state, so that a voltage necessary for oscillation is applied across the oscillating coil 11 and capacitor 20. In this condition, this oscillating capacitor is charged with a polarity with the upper terminal being positive and lower terminal negative, and at the same time, the voltage of the same polarity is generated in the coil 11. Further, the voltage of the oscillating coil 9 is so applied to the oscillating coil 11 to enhance the charge of the capacitor 20, since the coil 9 is back-coupled to the coil 11, i.e. on account of the positive feedback effect.

With initiation of discharge of the oscillating capacitor 20 after charge-up thereof, the polarity of the induced voltage of the oscillating coil 11 is reversed. The discharge current is caused to render the upper terminal of the capacitor 20 negative and the lower terminal thereof positive. At this time, the oscillating coil 9 is supplied, from the oscillating coil 11 provided in the back-coupled relationship with the former, with an induced voltage to turn off the once conducting transistor 12 so that the transistor is instantaneously cut-off. Sequentially, with further reversion of the discharge of the capacitor 20, the positive feedback effect of the oscillating coil 9 is instantaneously brought about as mentioned above.

This type of oscillation circuit is particularly referred to as a back-coupled type oscillation circuit of tuning circuit type oscillators. More specifically, this oscillator is a back-coupled type oscillation circuit, which is also of a collector-tank type oscillation circuit having a tank circuit in its collector circuit. This circuit oscillates at the same time that the human body comes close to the detecting plate 21 to a certain degree and the oscillating transistor 12 is brought into conduction. With the oscillation of the oscillation circuit 32 a certain voltage is induced in the output coil 16, by which voltage the capacitor 18 is charged through the diode 17. With a sufficient increase in the terminal voltage of the capacitor 18, the transistor 15 is brought into conduction to cause a current to flow through the relay coil 14. Thus, the relay contact 2 is opened to electrically open the load 3. In this case, as mentioned previously, the relay contact 2 may be either of the normally open type or the normally closed type in correspondence with the appliance in which the invention is utilized.

The capacitance $C_p$ when a part of the human body comes close to the detecting plate 21, amounts in general to several picofarads. In case where a stray capacitance $C_S$ in the vicinity of the detection board 21 is large in the above arrangement, the circuit constants should be previously set so as not to start oscillation due to stray capacitance. The stray capacitance $C_S$ has varied largely depending upon the surrounding conditions, and has heretofore resulted in an unstable oscillating operation. In case, however, where the semi-fixed capacitor 19 is connected between the collector and base of the oscillating transistor 12 to effect negative feedback thereby adjusting the starting point of the oscillation as in this invention, a stable initiation of the oscillation may be attained even at a large stray capacitance $C_S$.

The problem of stray capacitance was considered by the inventors from various angles. As a result, it was presumed that the stray capacitance in respect of the detection board 21 represents a total, including both a component related to the detecting plate 21 itself and a component related to a lead wire 22 for electrically coupling the detecting plate 21 and a part of the oscillator circuit 32. Especially, when the lead wire 22 was considerably long, a hardly negligible capacitance was exhibited. Since the detection plate 21 is, in fact, arranged at the farthest position of the body, such a long lead wire has been inevitable. It is considered that the stray capacitance thus became considerably large and that the same has induced the above-mentioned instability in operation. In case where any counter-measure, more specifically, the capacitive isolation to the outside has not been provided for the lead wire 22, so-called misoperation has been caused in which the oscillator circuit 32 is operated merely by the approach of a person or an animal to the electrical appliance with the oscillation circuit 32 provided thereon or merely by a change in the surrounding condition. It has been confirmed that, in order to expect stable oscillation, it is necessary to capacitively isolate the lead wire 22 from the outside. In this regard, according to this invention, the lead wire 22 is shielded from the outside with respect to electrostatic capacitance. In an example of the construction, the core connected to the detection board 21, namely, the lead wire 22 is enveloped by a shielding wire 23, which is earthed as illustrated.

As described above, according to this invention, a negative feedback element is added. Thus, a proximity switch may be provided which accomplishes a stable oscillation and which is very highly reliable without any misoperation. It is highly effective when used particularly in a domestic electrical appliance.

Furthermore, when the countermeasure of the capacitance isolation of the lead wire from the outside is taken, the variation in the stray capacitance becomes related only to the detection board. Thus, conjointly with the employment of the negative feedback element, a proximity switch of a more stable operation may be provided.

The proximity switch demonstrates the effect when applied to electrical products for domestic use, elevators and other equipment, and is very advantageous to industry.

It is a matter of course that this invention may be subject to a variety of modifications within the scope of the claims as defined below.

What is claimed is:

1. In a proximity switch comprising a series circuit consisting of a load, a relay contact and a power supply, an oscillation circuit for making and breaking said relay contact, and a DC power source circuit provided for applying DC voltage to said oscillation circuit and coupled to said power supply by a transformer, the improvements therein wherein a first series circuit consisting of a first oscillating coil and resistors and a second series circuit consisting of a second oscillating coil back-coupled to said first oscillating coil, an oscillating transistor and a resistor, are respectively connected to output terminals of said power source circuit, the base of said oscillating transistor is connected to the connection point between said first oscillating coil and one of said resistors of said first series circuit while a capacitor for negative feedback is connected between the collector and base of said oscillating transistor, and a detecting board is connected by a lead wire to one terminal of said first oscillating coil in order to control oscillation of said oscillation of said oscillating circuit, whereby when a capacitance related to said detecting board varies due to proximity of a human body to said detecting board, said oscillating circuit oscillates to control said relay contact through its output.

2. A proximity switch according to claim 1, wherein said lead wire is enveloped by a shielding wire, which is grounded.

* * * * *